March 3, 1970 W. G. WEBER 3,498,458
WATER HEATING AND FILTERING APPARATUS
Filed May 23, 1967
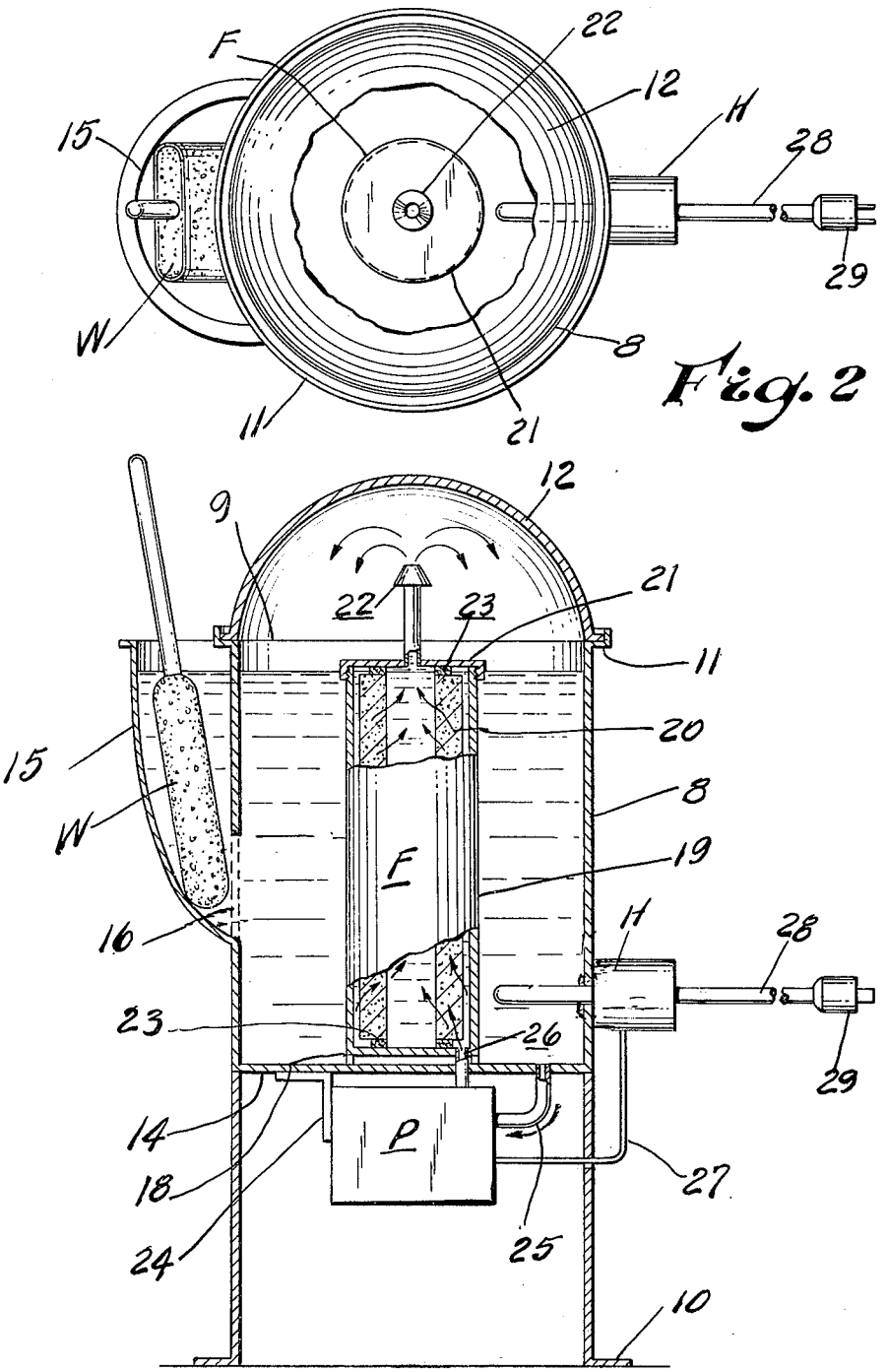
INVENTOR.
William G. Weber
BY
*Fearmian Fearmant*
*McCulloch.*
ATTORNEYS

United States Patent Office 3,498,458
Patented Mar. 3, 1970

3,498,458
WATER HEATING AND FILTERING APPARATUS
William G. Weber, 1404 Park St.,
Bay City, Mich. 48706
Filed May 23, 1967, Ser. No. 640,732
Int. Cl. B01d 35/18, 27/00
U.S. Cl. 210—167                                        1 Claim

ABSTRACT OF THE DISCLOSURE

The present invention relates to a cleaning apparatus used by gasoline station attendants for serving customers by washing and wiping automobile windshields, windows and headlights which, in use, become splattered with road dirt, oil and mud; said apparatus including means for continuously filtering, heating and re-circulating the water being used to provide clean water and wipers at all times.

---

Most gasoline station attendants use cloths or paper napkins for washing and wiping the vehicle windshields. They also wipe the ullage rod to determine if oil is required, and these wipers quickly become impregnated with oil and dirt, which is then transferred from car to car by the attendant's continued use of the soiled wipers, making it almost impossible to properly clean the automobiles when such service is required.

It is, therefore, one of the prime objects of the invention to provide an apparatus and a supply of filtered water, properly heated and continuously recirculated so that the wiping member is clean for use on each automobile entering the service station for gasoline, oil, or other services.

A device of this nature is designed for use by attendants of all gas stations and similar establishments to the end that the wiper used will be clean and clear, and the dirt on one automobile will not be transferred to the next.

One of the prime objects of the present invention is to provide a device of this nature for use by attendants of gasoline stations and similar establishments to the end that when the wiper is used on automobiles and returned to the container it is automatically cleaned and ready for use on the next automobile to be serviced, and the attendant's hands will also be clean for handling and contact with any of the articles used and normally handled by the gas station attendant.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

FIG. 1 is a vertical, sectional, elevational view illustrating my cleaning apparatus, parts being broken away to more clearly show the construction.

FIG. 2 is a top plan view thereof.

Referring now to the drawing in which I have shown the preferred embodiment of my invention, the apparatus comprises a water tank 8 which can be formed of sheet metal or any other material. It is preferably cylindrical in shape, and is formed with flanged foot sections 10 to provide stability. The tank 8 is also open at its upper end, being turned as at 11 to accommodate a preferably transparent plastic dome shaped cover 12 which is releasably connected to the turned section 11 in any desired manner.

A transversely disposed member 14 forms the bottom of the water compartment 8, and a wiper holder compartment 15 is provided on the side wall thereof and opens into the tank at 16, said compartment being of a size to accommodate the wiper W which can be of any desired shape so that it is easy to grasp for use when necessary. A conventional filter member F, having legs 18, is mounted on the member 14 and is preferably a sheet metal housing 19 in which filtering material 20 is mounted. A cover member 21 forms a closure for the upper end of the filter, and is provided with a centrally disposed spray head 22 provided on the cover 21. Gaskets 23 are provided at the top and bottom to provide spacing for easy flow.

A pump P is secured to the lower face of the member 14 by means of a bracket 24 and one or more connections 25 lead from the water supply to the pump, and thence lead through connections 26 to the filter, all as indicated by the arrows on FIG. 1 of the drawing. The heating element H is mounted on the side wall of the apparatus and projects into the water supply, and a cord 27 leads from the heater H to the pump P for heating purposes, and a cord 28, provided with a plug 29, is connected to a suitable source of electrical energy (not shown), and water from the tank 8 flows from the heating element H to the pump, hence is forced through the filter out the spray head 22 and continuously recirculates. The apparatus can be spotted in any location convenient for the attendant and is readily movable as deisred, a suitable switch (not shown) being provided for energizing as desired.

From the foregoing description it will be obvious that I have perfected a very simple, economical and convenient apparatus for use in servicing automobiles in service stations in general.

I claim:

1. A combination water heating and filtering apparatus comprising: a tank; an open compartment adjacent the side of said tank in fluid communication therewith; a filter unit mounted on said tank with a fluid passage therethrough in communication with a liquid discharge nozzle; a housing for said filter unit; a recirculating pump mounted on said tank; fluid communication means from said pump to the interior of said housing, from the interior of said filter unit to said discharge nozzle, from said nozzle to the area in said tank surrounding said filter housing, and from the liquid contained in said tank surrounding the housing to the inlet side of said recirculating pump; and heating means for the liquid in the tank.

References Cited

UNITED STATES PATENTS

| | | | |
|---|---|---|---|
| 471,840 | 3/1892 | Blessing | 210—278 |
| 2,861,689 | 11/1958 | Lyall | 210—289 |
| 3,045,827 | 7/1962 | Hough | 210—169 |

REUBEN FRIEDMAN, Primary Examiner

T. A. GRANGER, Assistant Examiner

U.S. Cl. X.R.
210—184